United States Patent [19]

Cap

[11] 4,422,116
[45] Dec. 20, 1983

[54] DEVICE FOR ADJUSTING SOUND HEAD PLATFORMS

[75] Inventor: Heinrich Cap, St. Georgen-Peterzell, Fed. Rep. of Germany

[73] Assignee: Papst Motoren GmbH & Co. KG, St. Georgen, Fed. Rep. of Germany

[21] Appl. No.: 286,550

[22] Filed: Jul. 24, 1981

[30] Foreign Application Priority Data

Jul. 30, 1980 [DE] Fed. Rep. of Germany ....... 3028856

[51] Int. Cl.³ .............................................. G11B 5/56
[52] U.S. Cl. ................................................. 360/109
[58] Field of Search ....................... 360/109, 104, 128

[56] References Cited

U.S. PATENT DOCUMENTS

| 3,155,359 | 1/1964 | Hogan et al. | 360/109 |
| 4,052,745 | 10/1977 | Nakamichi | 360/109 |
| 4,268,881 | 5/1981 | Saito | 360/109 |
| 4,329,723 | 5/1982 | Schoenmakers | 360/109 |

Primary Examiner—Bernard Konick
Assistant Examiner—Kin Wong
Attorney, Agent, or Firm—Michael J. Striker

[57] ABSTRACT

In order to simplify the adjusting of a device for adjusting of sound head platforms for sound records, cassette sound recorders or digital storage devices which comprise a transport shaft, a sound head platform, a support for supporting the sound head platform and a sound head, a pivot bearing as well as a knife edge bearing are disposed successively in a radial plane to the transport shaft on the support which supports the sound head platform, the sound head platform is supported on the knife edge bearing and on the pivot bearing in direction and beneath the sound head main axis and is pushed against the pivot bearing and the knife edge bearing by a spring perpendicular with respect to the sound head platform and by at least one bearing axis formed by the pivot bearing and the knife edge bearing at a perpendicular distance, whereby the associated counter bearing for the spring is disposed about symmetrically with respect to the sound head main axis.

5 Claims, 1 Drawing Figure

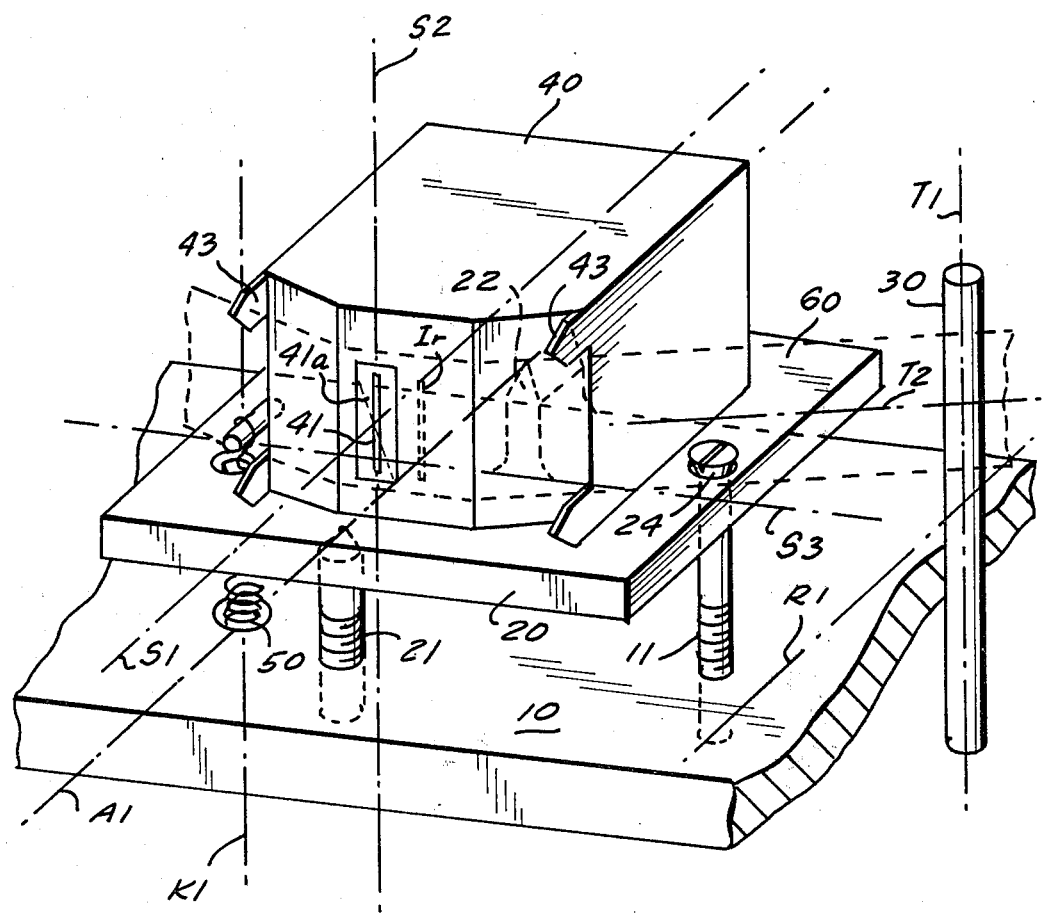

DEVICE FOR ADJUSTING SOUND HEAD PLATFORMS

The invention relates to a device for adjusting sound head platforms for sound recorders, cassette sound recorders or digital data storage devices which comprise a transport shaft, a sound head platform, a support for supporting the sound head platform and a sound head.

In devices of this type the air space of the sound head must be very exactly extend parallel to the transport shaft axis for maintaining the compatibility with devices of other manufacturers, in the final analysis for the exchangeability of the data storage, because otherwise a reduction of the information content occurs when transmitting from the data storage to the sound head.

The parallelity of air space and transport shaft is very often adjusted by a tumbling adjustment in the hitherto used devices. In such a tumble adjustment, mostly a plate supporting the sound head which is pressed by means of three springs mounted on the support for the sound head platform against three adjustment screws, whereby the adjustments of the rotating coordinates are not independent of each other, so that the adjustment of the sound head can be made only at a very exact determined succession, and is therefore substantially bound to the manufacturer.

It is therefore one object of the invention to simplify the adjustment.

This object of the invention is obtained in that on the support which supports the sound head platform, a pivot bearing as well as a knife edge bearing are disposed successively in a radial plane to the transport shaft, that the sound head platform is supported on the knife edge bearing and on the pivot bearing in direction and beneath the sound head main axis and is pushed against the pivot bearing and the knife edge bearing by a spring perpendicular with respect to the sound head platform and by at least one bearing axis formed by the pivot bearing and the knife edge bearing at a perpendicular distance, whereby the associated counter bearing for the spring is disposed about symmetrically with respect to the sound head main axis.

The advantage of this device consists in that the two rotating coordinates for adjusting the parallelity to the transport shaft are independently adjustable, so that special adjustment sequences do not have to be observed, so that the device can be simply adjusted outside of the manufacturer's factory.

This is in particular advantageous when the device for the height adjustment of the tape guide is independent from the device for the height adjustment of the sound head platform.

Particularly advantageous is the design of the pivot bearing in the form of an adjustment screw, because the tilting of the sound head is very easily adjustable.

On the other hand, the knife edge bearing is advantageously stationary tip stretched on the support of the sound head platform, that is, in cast housings by means of corresponding casting molds and in sheet metal housings by deflection of a sheet metal lug.

The counter bearing for the pushing spring is advantageously designed as a screw with a conical counter sunk head, because in this manner a centering of the device is made possible and a commercially available structural element may be used.

Advantageously, the screw is screwed into the sound head platform.

The invention will be explained in accordance with the drawing which shows further details.

A pivot bearing 21 and a knife edge bearing 22, on which the sound head 20 is supported, are mounted on a support 10 for sound head platform 20. The axis A1 which is formed by the pivot bearing 21 and the knife edge bearing 22 extends parallel to a radial direction R1 to a transport shaft 30. Therefore, axis A1 is disposed in a radial plane to the transport shaft 30.

The sound head main axis S1 of sound head 40 extends parallel to axis A1 and the air slot 41 of the sound head extends perpendicular to the sound head platform 20 with axis S2. A force K1, for example, by a spring 50 rotates the sound head platform 20 around the axis A1 until it is pushed against the counter bearing 24, a flanged bore in the sound head platform and a cone of a screw 11 in support 10.

The adjustment is carried out in a manner that, for example, at first axis S2 is brought into a plane which is parallel to axis T1 by adjusting screw 11. When the sound head platform is rotated around axis S3 by adjusting screw 21, the axis of the air slot S2 can be already adjusted with the second adjustment step parallel to transport axis T1. Collectively, the condition: S2 parallel T1 is obtained by two simple adjustments on screws 21 and 11. Thereby, an information Jr applied vertically with respect to axis T2 of the magnetic tape 60 is completely grasped by the air slot 41 and not only at a small portion, if the air slot would have assumed the position 41a.

The adjustment of the parallelity of the transport shaft axis T1 and the air slot axis S2 is particularly simple when the height of the magnetic tape on the sound head to be maintained relative to the total magnetic tape guide, which is defined by guides 43, can be carried out by other means, for example, by an adjustment of the height of support 10, not shown in the drawings.

The structural costs, two screws, a spring is extremely low, as well as the means of adjustment, as described.

For generating the force K1, different spring configurations may be used without leaving the framework of the invention.

I claim:

1. Device for adjusting a sound head platform with respect to a transport shaft in sound recorders, cassette sound recorders or digital data storage apparatus which include a transport shaft, a sound head platform for supporting a sound head having a main axis and a support for supporting the sound head platform, comprising a pivot bearing and a knife edge bearing mounted on said support; said pivot bearing and said knife edge bearing extending through a bearing axis which lies parallel to said main axis and beneath thereof, said bearing axis extending in a plane radial to the transport shaft, the sound head platform being supported on said pivot bearing and said knife edge bearing; a spring extended normal to the sound head platform and adapted to push the sound head platform against the pivot bearing and the knife edge bearing; and a counter bearing on which the sound head platform is supported, said counter bearing being mounted on said support and extended at a distance from said bearing axis towards said transport shaft, said spring rotating said sound head platform about said bearing axis until it is pushed against said counter bearing.

2. Device in accordance with claim 1 wherein the pivot bearing is designed as an adjustment screw (21).

3. Device in accordance with claim 2, wherein the knife edge bearing (22) is tip stretched onto the support (10) for sound head platform (20).

4. Device in accordance with claim 3, wherein the counter bearing (24) which is associated with said spring (50) is formed by a screw (11) with a conical counter sunk head.

5. Device in accordance with claim 4, wherein the screw (11) is screwed into the support (10) for the head sound platform (20).

* * * * *